United States Patent
Patterson

(10) Patent No.: US 7,333,974 B2
(45) Date of Patent: Feb. 19, 2008

(54) QUEUING MODEL FOR A PLURALITY OF SERVERS

(75) Inventor: James Edmund Patterson, Ottawa (CA)

(73) Assignee: Cognos, Inc., Ottawa, Ontario (CA)

( * ) Notice: Subject to any disclaimer, the term of this patent is extended or adjusted under 35 U.S.C. 154(b) by 364 days.

(21) Appl. No.: 10/366,475

(22) Filed: Feb. 14, 2003

(65) Prior Publication Data

US 2003/0182261 A1   Sep. 25, 2003

(30) Foreign Application Priority Data

Feb. 15, 2002   (CA) .................................. 2372092

(51) Int. Cl.
*G06F 17/30*   (2006.01)

(52) U.S. Cl. .............. 707/3; 707/2; 707/202; 709/223

(58) Field of Classification Search .............. 707/1–10, 707/100–104.1, 200–205; 715/705; 717/127; 718/105; 709/203, 204, 223, 246
See application file for complete search history.

(56) References Cited

U.S. PATENT DOCUMENTS

| | | | | |
|---|---|---|---|---|
| 5,341,477 | A | | 8/1994 | Pitkin et al. ................ 395/200 |
| 5,553,289 | A | * | 9/1996 | Johnson et al. ............. 715/705 |
| 5,675,797 | A | | 10/1997 | Chung et al. |
| 5,696,969 | A | | 12/1997 | Egolf |
| 5,742,806 | A | * | 4/1998 | Reiner et al. .................. 707/3 |
| 5,761,307 | A | | 6/1998 | Möhrmann et al. |
| 5,761,507 | A | | 6/1998 | Govett |
| 5,774,660 | A | | 6/1998 | Brendel et al. |
| 5,799,173 | A | | 8/1998 | Gossler et al. |
| 5,844,980 | A | | 12/1998 | Patel et al. |
| 5,857,180 | A | * | 1/1999 | Hallmark et al. .............. 707/2 |
| 5,881,269 | A | * | 3/1999 | Dobbelstein ................ 709/203 |
| 5,889,944 | A | | 3/1999 | Butt et al. |
| 5,974,462 | A | | 10/1999 | Aman et al. |
| 6,003,083 | A | | 12/1999 | Davies et al. |
| 6,023,722 | A | | 2/2000 | Colyer |
| 6,058,394 | A | | 5/2000 | Bakow et al. |
| 6,178,438 | B1 | * | 1/2001 | Tschirhart et al. .......... 709/200 |
| 6,195,682 | B1 | * | 2/2001 | Ho et al. .................... 709/203 |
| 6,209,018 | B1 | * | 3/2001 | Ben-Shachar et al. ...... 718/105 |
| 6,546,403 | B1 | * | 4/2003 | Carlson et al. ............. 707/202 |
| 6,901,440 | B1 | * | 5/2005 | Bimm et al. ................ 709/223 |
| 6,901,582 | B1 | * | 5/2005 | Harrison .................... 717/127 |
| 7,082,458 | B1 | * | 7/2006 | Guadagno et al. .......... 709/204 |
| 7,111,077 | B1 | * | 9/2006 | Starkovich et al. ......... 709/246 |

* cited by examiner

*Primary Examiner*—Shahid A Alam

(74) *Attorney, Agent, or Firm*—Finnegan, Henderson, Farabow, Garrett & Dunner, LLP

(57) ABSTRACT

The current invention provides a system and method for queuing and distributing requests to one or more query servers. The system contains a first tier queue associated with a server based mechanism for directing service requests to a second tier queue associated with each of the one or more query servers. The current invention provides a "pull" model for the distribution of an initial service request of a query containing two or more service requests. Subsequent service requests from this query are assigned to a query server without being placed in a first tier queue. These subsequent service requests are placed directly in the queue of the query server that handled the previous service request from the same query.

8 Claims, 6 Drawing Sheets

QUEUING MODEL FOR A PLURALITY OF SERVERS

FIELD OF INVENTION

The invention relates generally to computers, and more particularly to a queuing model for accessing information from a plurality of servers.

BACKGROUND OF THE INVENTION

There are two basic models used for creating a queue. They are commonly known as the bank line model and the grocery line model because of their use in these industries. The bank line model employs a single queue that is serviced by a plurality of service providers. In this model the queue advances by one each time a service provider becomes available and the first request in the queue is assigned to the newly available service provider. The time that a request resides in the queue is a function of the service times for all of the requests that are in front of it in the queue. This model of queuing is functionally known as a "pull" model whereby service requests are pulled from the queue when they can be fulfilled.

The grocery store model, on the other hand, employs a queue for each service provider. This model of queuing employs a "push" model of assignment whereby requests are assigned to a queue associated with each service provider. Generally there is a control mechanism associated with such queues that tries to estimate the time required to fulfill the tasks in each queue. This information is then fed into an optimisation scheme to determine to which queues service requests should be assigned. The time required for service in the grocery store model is quite variable due to the possibility of entering a queue where all of the requests that are ahead in the queue are serviced quite quickly or the possibility that one or more of the requests in the queue require considerable time to be serviced. In general the time required to fill a request in the bank line model is considerably less variable, but not necessarily less, because every request in the queue is dependant on the time required for each request being served ahead of it. There are no "faster" queues in this model. A disadvantage in either model is the possibility of a request being serviced by a provider that is not well suited for the request.

The above discussion of queuing models should now be brought into the context of information retrieval systems where requests for information are presented to a plurality of servers or mechanisms operating thereon that are capable of providing the requested information. The queues used in such information retrieval systems are often, more refined derivatives of the basic queuing models presented above with the refinements reflecting the desire for improved efficiency and an optimization of the method of dealing with requests from a particular client type or requesting information of a particular type.

The servers and mechanisms operating thereon used for the delivery of information are often arranged in two tiers. The first tier generally contains a mechanism that interfaces between a source of service requests and the servers of the second tier. The first tier also contains a mechanism that manages the assignment of requests to the second tier servers. Second tier servers that supply the information requested in service requests are referred to as query servers. A first tier server further will contain a queue (first tier queue) which holds service requests prior to them being distributed to a query server. The distribution of requests contained in the first tier queue to query servers can take place by one of two methods; they can be "pushed" by the first tier server on to a server of the second tier or they can be "pulled" from the first tier server by a server of the second tier, which can be either a query server or a server that manages a group of query servers. These two basic methods of assigning requests have advantages and disadvantages that at least in part reflect the nature of client requests being serviced. Both of these strategies require a first tier server that manages the assignment of service requests and maintains a queue that holds service requests prior to their distribution to query servers.

The "push" model of assigning requests to a server generally uses a two tier queue model. Service requests are queued in the first tier queue until they are assigned to a query server where they will be queued again. There are numerous approaches to assigning a request to a query server which generally rely on some form of server management. In one case the server that maintains the "main" queue, or an associated control server, maintains data on the response time required for query servers to fulfill service requests. This data, or calculations based on it, is used by the server of the first tier when assigning requests to query servers. The process aims to minimize the response time for a given service request. However, the ability to predict the time required for a given query server to fulfill a newly assigned service request is never completely accurate, casting doubt on the usefulness of the exercise. In another "push" model service requests are assigned to servers according to the request "type". Service requests are assigned to a query server if that server is currently servicing requests of the same type. If there are no servers currently fulfilling service requests of the same type as the request about to be assigned to a query server the requests is assigned based on the above or similar server management considerations.

A second model for the assignment of requests in a queue is the "pull" model. The pull model also employs a two tier arrangement of servers. The level of server management that is required for the assignment of service requests is quite a bit lower than with the "push" model. Servers of the second tier simply indicate that they are ready to accept another service request instead of a control server requesting status updates for the second tier servers to determine their current request load.

In U.S. Pat. No. 6,023,722, Coyler presents a "pull" queue model that is applied to servicing of information requests from the World Wide Web. There is only one queue, associated with the first tier server, in the system presented in this patent. A queue at the second tier servers is not necessary as a new service request is only assigned to a second tier server once the server has completed the previous request and has indicated that it is ready to process another request. It is indicated that this model of assigning information requests to server of the second tier is more efficient because the server managing the main queue does not have to continually query the second tier servers to determine their current status.

Business Intelligence (BI) applications are often focused on the production and editing of complex reports that are based on information contained in a data warehouse. The manipulation (including editing and authoring) of such reports involves multiple requests for data from a database. Thus the manipulation of such reports requires multiple requests to the database or data warehouse to obtain the required information. These multiple requests are often included in the same general query to the data warehouse.

For example, the results of a query request are usually presented in pages, typically, of say 10 rows of data per page, with an individual service request being required to return each of these query pages.

It is the nature of contemporary database systems that information requests to a database usually involve a query preparation stage followed by a stage where rows of data are retrieved. Most of the data processing associated with a request to a database is generally performed in the query preparation stage (e.g. all rows of data identified in the query may need to be sorted). Thus, in cases of a plurality of requests within a single query the resources (and cost) associated with the first request of a query are often considerably higher than those associated with later requests against the same query. These later requests will only need to retrieve a fixed number of additional rows and not perform the preparatory work associated with the query.

Editing of business intelligence reports is also enabled by server requests which retrieve "metadata" or descriptions of the underlying reports themselves for the client to modify or apply modifications to those report definitions to a persistent store of reports. The query servers in this application provide the database access and document formatting necessary to create these reports dynamically based upon requests from the clients. Any activity of sufficient complexity or which needs to access centralized resources would benefit from a client-server architecture that reflects the above use of multiple requests within a single query.

There is a need for a system and method of providing information from a database to queries to the database that contain numerous service requests. The system and method should consider efficiencies related to the provision of information to closely related requests within a single query.

SUMMARY OF THE INVENTION

In accordance with one aspect of the invention a system for distributing a service request to a query server is provided. The service request is from a query and the query server is from one or more query servers that are suitable for fulfilling the service request. The system comprising an interface component that operates on a server, determines if the service request has a server identification parameter included with it, the server identification parameter identifying a query server from the one or more query servers that has handled a previous service request from the query, and distributes the service request to the query server identified by the server identification parameter if the same is included with the service request, else distributes the service request to an available query server; and a first server based mechanism for receiving information related to at least one of the one or more query servers, the server based mechanism communicating with the interface component and directing the interface component with regard to distribution of service requests.

In accordance with another aspect of the invention a system for providing information from a database to a client that provides a service request, is provided. The system comprising an interface component that operates on a server, determines if the service request has a server identification parameter included with it, the server identification parameter identifying a query server that has handled a previous service request from the query, and distributes the service request to the query server identified by the server identification parameter if the same is included with the service request, else distributing the service request to an available query server, one or more query servers, the one or more query servers receiving service requests from the interface component, a first server based mechanism for receiving information related to the one or more query servers, the server based mechanism communicating with the interface component and directing the interface component with regard to distribution of service requests, and a first server, the first server having the first server based mechanism operating thereon.

In accordance with another aspect of the invention a method of routing a service request to a query server is provided. The query server being one of one or more query servers, the one or more query servers being elements of a system for distributing service requests, the service request being from a query, the system having an interface component for interfacing between a source of service requests and the one or more query servers and a mechanism for directing service requests. The method comprising the steps of invoking the interface component by the source of service requests upon the receipt of the service request, routing the service request by the interface component to either an available query server or to an identified query server if a server identification parameter is included with the service request, the server identification parameter identifying the identified query server as having handled a previous service request from the query, monitoring the interface component by the mechanism for directing the service request, and monitoring the one or more query servers for a notification from the query servers regarding a status of the query servers.

BRIEF DESCRIPTION OF THE DRAWINGS

The invention will be described with reference to the accompanying drawings, wherein.

DETAILED DESCRIPTION OF EMBODIMENTS OF THE INVENTION

Figure 1:
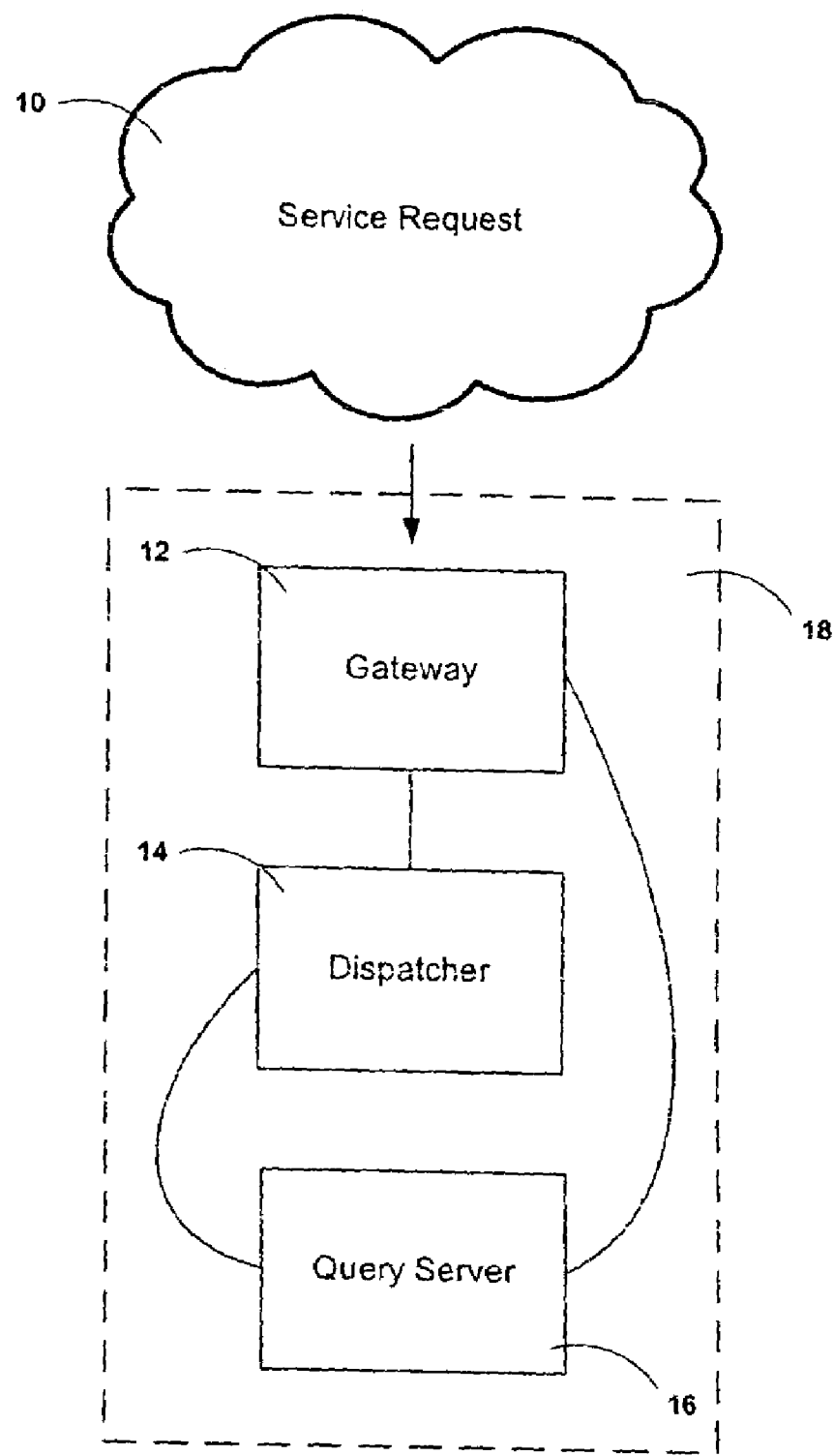
FIG. 1 is a schematic diagram illustrating elements of the queuing model according to an embodiment of the invention.

FIG. 1 is a schematic diagram illustrating an embodiment of the invention. A service request 10 is provided to a system 18 for the provision of information requested therein. Receipt of the service request 10 leads to the invoking of a gateway 12. The gateway 12 either forwards the service request to a dispatcher 14 to be placed in a queue contained therein or it forwards the service request to a query server 16. Specifics of the service request 10 will determine how it is routed by the gateway 12 within the system 18. Service requests that are queued in the dispatcher 14 are dequeued and returned to the gateway 12 for forwarding to the query server 16 after the query server 16 indicates it is able to accept a service request.

Figure 2A:
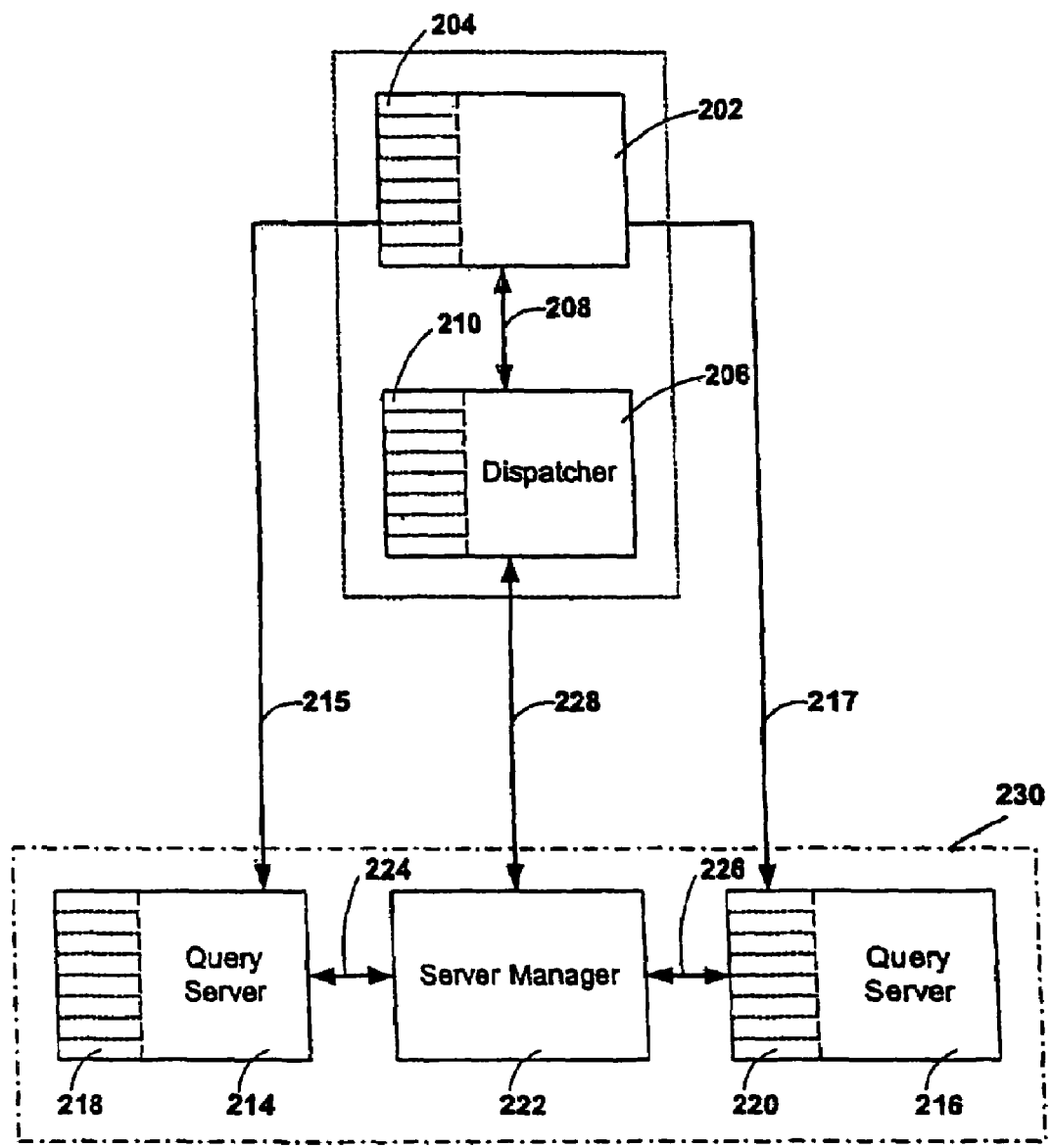
FIG. 2a is a schematic diagram illustrating an arrangement of servers and queues that are suitably used in an embodiment of the invention.
Figure 2B:
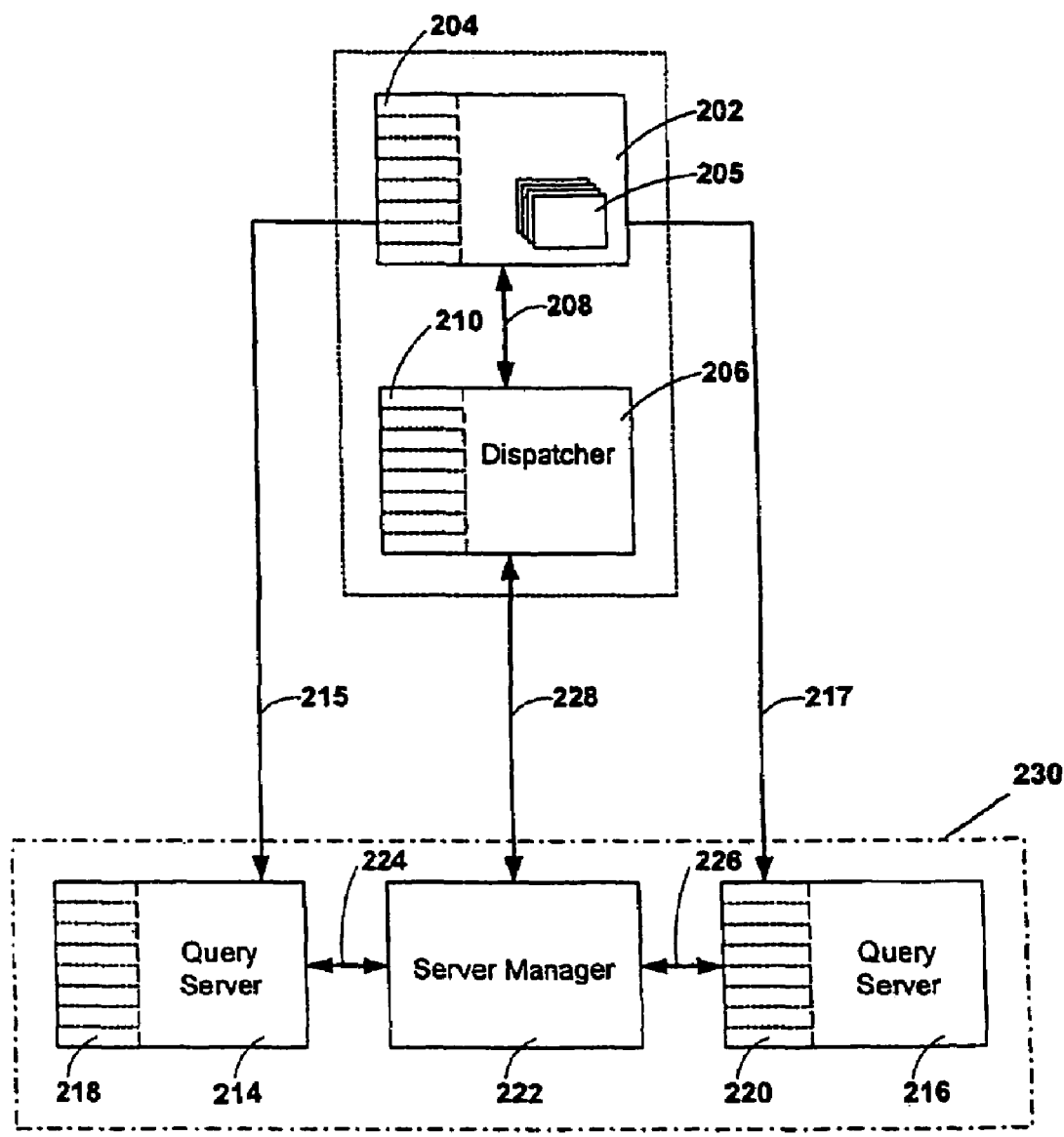
FIG. 2b is a schematic diagram illustrating an arrangement of services and queues that are suitably used in an embodiment of the invention.

The system of the current embodiment and an arrangement of servers on which this system is suitably used is schematically presented in FIGS. 2A and 2B. A web server 202 acts as a source of service requests for the system and method of the current embodiment. The service requests may be queued in a queue 204 that is an element of the web server 202. A gateway 205 is an interface component between the web server 202 and at least one server based mechanism of the current embodiment.

The gateway 205 is connected to and in communications with a dispatcher 206. This connection is formed by a communications link 208. The dispatcher 206 is a server based mechanism that directs service requests that are provided to it by the gateway 205. The dispatcher 206 contains queue 210 that is suitable for queuing service requests. The dispatcher 206 may be considered as an element of the first tier and queue 210 maybe considered as a first tier queue.

The gateway 205 is further connected to and in communications with one of servers 214 and 216 via communications links 215 and 217, respectively. The servers 214 and 216 generally provide an information provision mechanism that can retrieve information from a database or data warehouse. They more specifically provide query server processes. Servers 214 and 216 will be referred to as query servers to reflect the mechanisms operating thereon. The query servers 214 and 216 contain a queue, 218 and 220, respectively.

A server manager 222 is connected to and in communication with query servers 214 and 216 via communications links 224 and 226, respectively. The server manager 222 is further connected to and in communications with the dispatcher 206 via communications link 228. In the current embodiment the query servers 214 and 216 and the server manager 222 are mechanisms operating on a single server 230. The server 230 and the queues contained therein may be considered as from the "second tier".

The communications links 208, 215, 217, 224, 226 and 228 are any suitable communications links as would be apparent to those of skill in the art. This includes both hardware and software links for instances where the servers are physically separate entities or elements of the same computer, respectively. In the current embodiment industry standard TCP/IP networking protocols are implemented. However, it will be apparent to one skilled in the art that any networking protocols could be substituted without affecting the scope of the embodiments of the invention. Communication links which provide for communications amongst processes operating or the same machine, communication links i.e. 224 and 226, are implemented using non-networked interprocess protocols as will be known to those of skill in the art. Such interprocess protocols may be more efficient in some environments.

The operation of the system of the current embodiment will now be discussed. The web server 202 is able to queue service requests in queue 204 prior to the invocation of gateway 205. The gateway 205 is invoked by the web server 202 upon the receipt of a service request by the web server 202. This invocation of gateway 205 is performed for each service request. Service requests received from the web server 202 are passed to the gateway 205 using a common gateway interface protocol, as will be known to those of skill in the art. There may be a plurality of active gateway requests at any particular point in time, a gateway request being a service request that is delivered by the gateway 205. After invoking gateway 205 web server 202 is not involved in the distribution and queuing of service requests.

The dispatcher 206 is connected to and in communication with the server manager 222. The server manager 222 is connected to and associated with query servers 214 and 216. The server manager 222 monitors the activity, including availability and performance, on the query servers 214 and 216. The server manager 222 provides this information to the dispatcher 206. For example the dispatcher 206 receives the network address of an available query server from server manager 222 and forwards this address to the gateway 205. Gateway 205 further negotiates between dispatcher 206 and query servers 214 and 216.

The server manager 222 is a server based mechanism that provides a controlling process for the one or more query server processes executing on the query servers 214 and 216. The server manager 222 is responsible for initiating and terminating the configured number of query server processes according to the requirements of the system and it monitors each query server process to ensure that it is functioning correctly. Server manager 222 further maintains an open connection to the query servers 214 and 216 associated with it. The query servers 214 and 216 communicate status information to the server manager process that started it as service requests are initiated or completed to the server manager 222. As the server manager 222 receives this information it collects it into packets and forwards it along to any dispatcher that may have registered with it.

Figure 3:
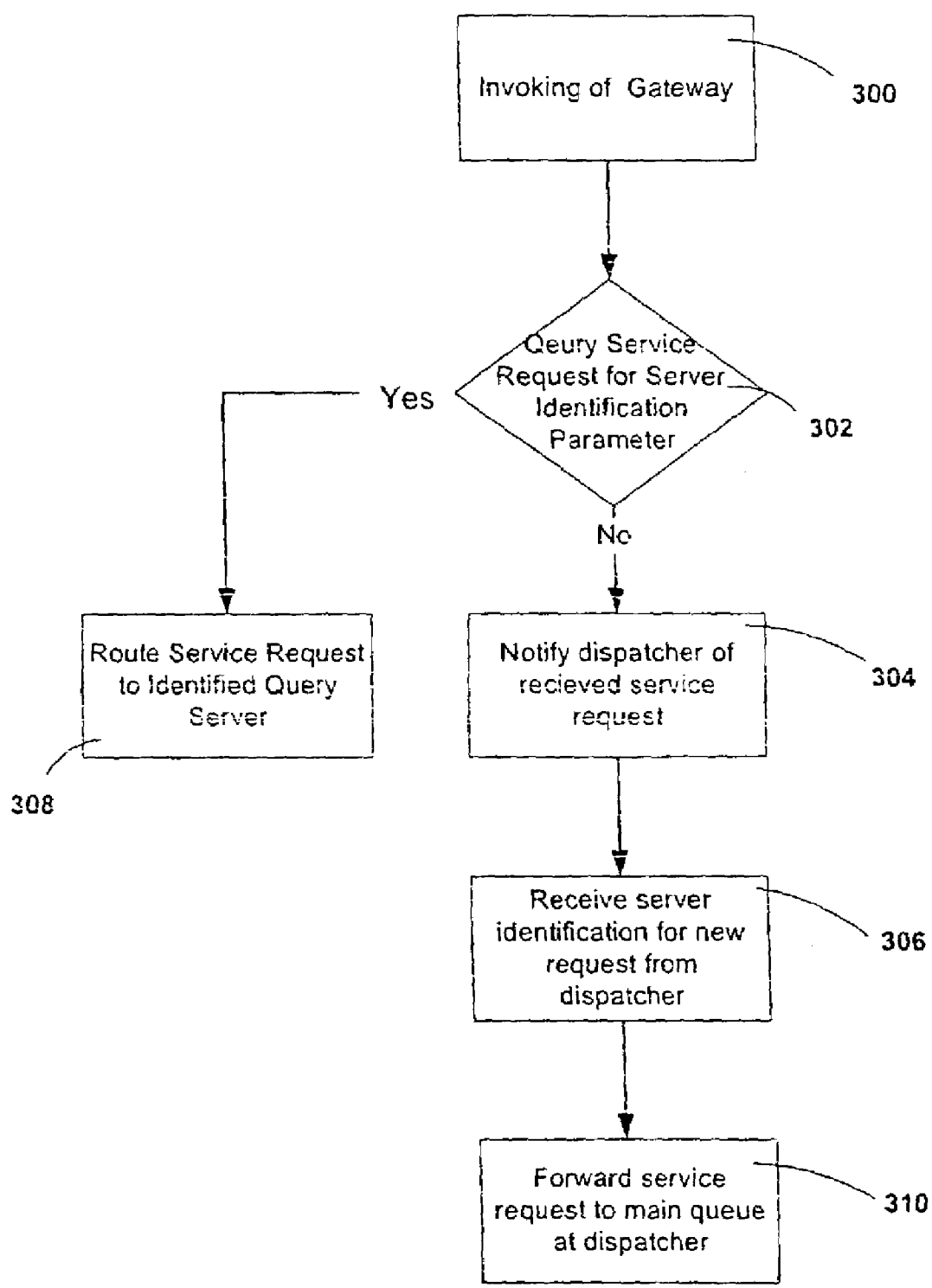
FIG. 3 is a flow chart illustrating steps related to the movement of service requests associated with the gateway according to one embodiment of the invention.

The queuing of service requests in the first tier queue 210 of the dispatcher 206 and the distribution of service requests by the gateway 205 is facilitated by a process comprising steps that are performed by the dispatcher 206 and the gateway 205. The process according to an embodiment of the invention will be presented in three flow charts. FIG. 3 considers the steps that are performed by the gateway 205 while FIGS. 4 and 5 consider those steps that are performed by the dispatcher 206.

FIG. 3 is a flow chart illustrating steps occurring on the gateway 205 which are associated with the movement of service requests through the system of the current embodiment. A service request is received at step 300 and the gateway 205 is invoked. The gateway 205 interrogates the service request at step 302 to determine if there is a server identification parameter included with it.

Server identification parameters are included with a response to a service request and will be included with subsequent service requests from the same query. Server identification parameters identify the query server to which a previous service request from the same query was dispatched. In the current embodiment the server identification is encoded in a parameter of the form IWS_SRVLOC=value where value specifies the network location of the query server that bad previously handled a request from the same query as the current request. Each instance of the query server must have a unique network identity. In a TCP/IP network this is provided by the IP address and a TCP port number. The Server Identification Parameter encodes this information into a string format that is consistent with the web server protocol where it is used. It will be apparent to those skilled in the art that the server identification parameter can possess other formats that indicate the network location of the query server.

If the service request has a server identification parameter associated with it the service request is forwarded to the query server identified in the server identification parameter at step 308. Thus, a service request with which a server identification parameter is included is forwarded directly from gateway 205 to the query server identified by the server identification parameter. A service request that is the first request of a query will not have a server identification parameter included with it. If the service request does not have a server identification parameter included with it the gateway 205 forwards the service request to the dispatcher 206 at step 304. In the current embodiment the entire service request is not actually forwarded to the dispatcher. Rather a service request's identification information including the user and application is forwarded to the dispatcher 206. It will be apparent to one skilled in the art that additional identification information or the entire service request could be forwarded to the dispatcher 206. At step 306 the gateway 205 receives a query server identification from the dispatcher 206 for a query server that has indicated it is available for a service request. The gateway 205 forwards the service request to the query server identified in the query server identification at step 310. At either step 308 or step 310 the service request is placed in the queue associated with the query server to which the request is routed.

Figure 4:
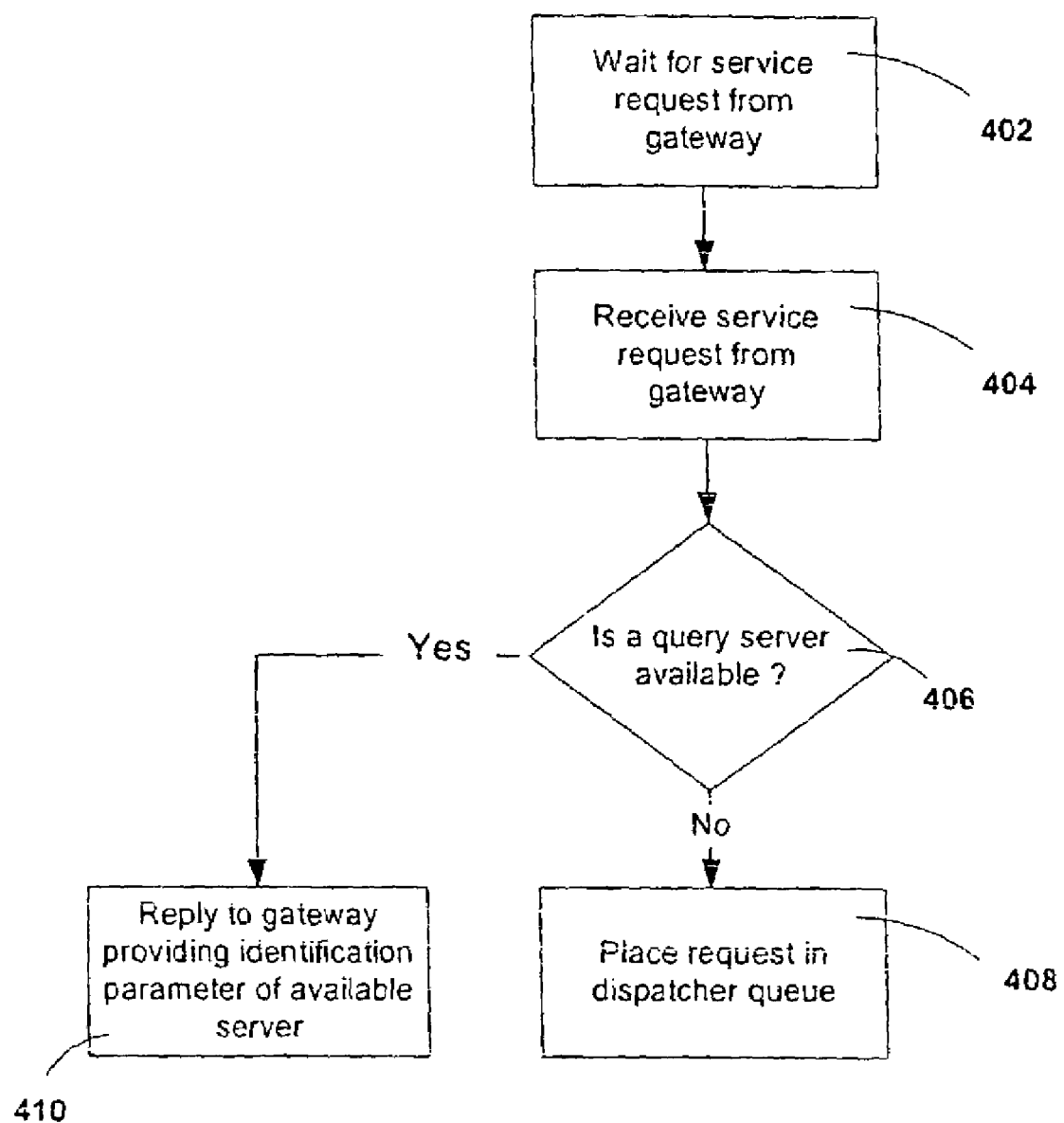
FIG. 4 is a flow chart illustrating steps related to the movement of service requests associated with the dispatcher request listener process thread according to one embodiment of the invention.

A flow chart illustrating the steps that are performed by the dispatcher 206 with respect to interactions with the gateway 205 is presented in FIG. 4. These steps are steps in the request listener process thread i.e. where the dispatcher listens for service requests from the gateway. At step 402 the dispatcher 206 waits to receive a service request from the gateway 205. At step 404 the dispatcher 206 receives a service request from the gateway 205. At step 406 the dispatcher 206 queries whether there is a query server available to receive the service request. If there is a query server available the dispatcher 206 provides the server identification parameter of the available server to the gateway 205 at step 410. This identification parameter is received by the gateway 205 at step 306 of FIG. 2. If there is no available query server at step 406 the service request is placed in the queue 210 of the dispatcher 206. The process returns to step 402 from either step 410 or 408.

Figure 5:
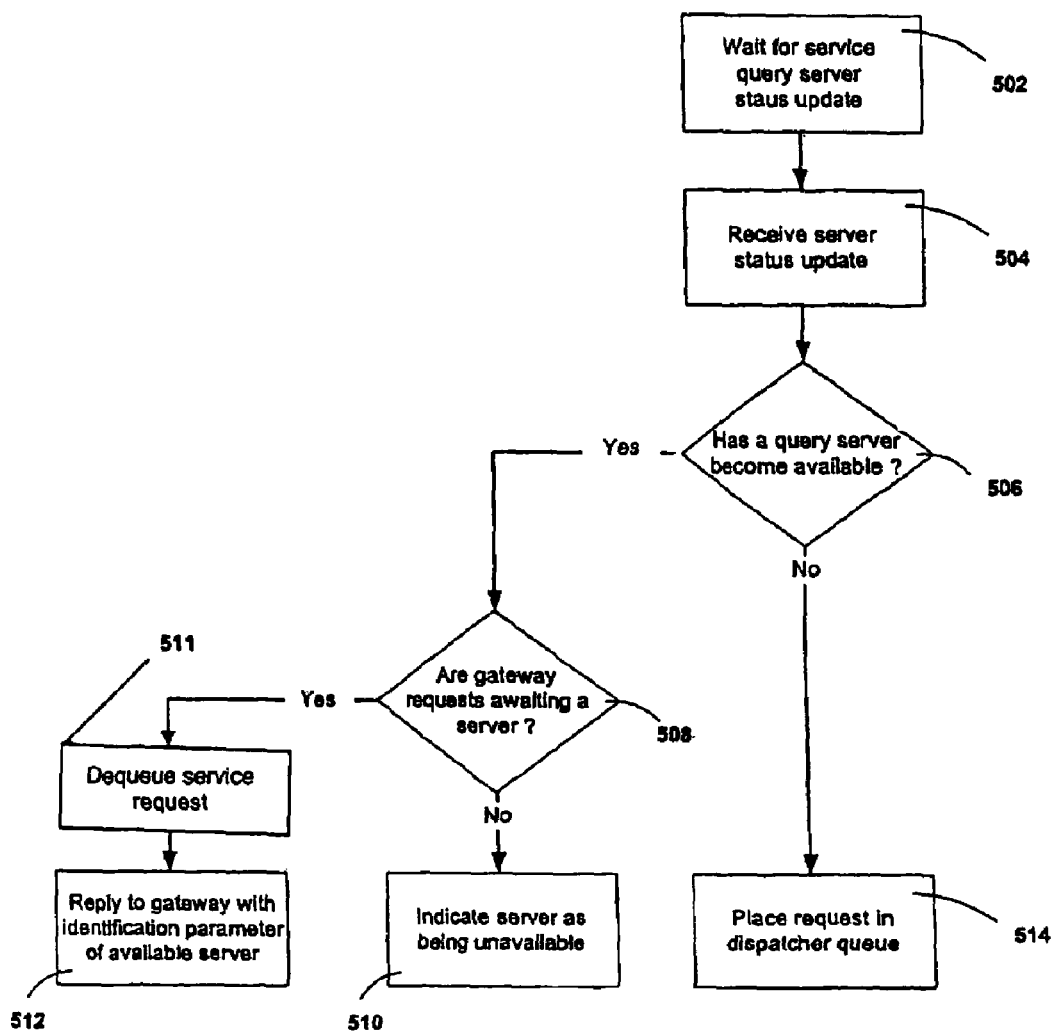
FIG. 5 is a flow chart illustrating steps related to the movement of service requests associated with the dispatcher query server monitor process thread according to one embodiment of the invention.

FIG. 5 presents a flow chart of another processing thread that is performed by the dispatcher 206. This processing thread monitors for available query servers. The dispatcher 206 waits for a query server status update at step 502. Such a status update is provided to the dispatcher 206 when the status of a query server changes. Such changes include a query server becoming busy with a new service request and a query server becoming available when it finishes completing all requests currently assigned to it. This process of updating the dispatcher 206 follow a "pull" model of distributing queued service requests. At step 504 the dispatcher 206 receives such an update. At step 506 the dispatcher 206 queries the update as to whether a query server is available. If a query server has become available the dispatcher 206 examines queue 210, at step 508, as to determine whether there are gateway requests awaiting a query server. Such waiting gateway requests were placed in the queue 210 of dispatcher 206 at step 408 of FIG. 4. If there are waiting gateway requests the dispatcher 206 dequeues a waiting gateway request at step 511. The dispatcher 206 then forwards the service request with a query server identification of an available query server to the gateway 205 at step 512. The query server identification is received by the gateway 205 at step 306 of FIG. 3. Else, if the are no service requests awaiting a query server, the dispatcher 206 marks the available query server as such at step 510. If the update received at step 504 indicated a query server is busy the dispatcher 206 marks the query server as unavailable at step 514. The process now returns to step 502.

A service request waiting in the queue 210 of the dispatcher 206 remains queued until the requests in front of it in the queue are dispatched and a query server identifies itself as available to accept a new request. A query server is deemed available when it no longer has requests queued in its queue. Thus the query servers "pull" service requests from queue 210 of dispatcher 206.

Even though a given query server may indicate that it is available for a new service request in the server status update a service request forwarded to it may be qeueued in the queue of the query server. This situation may arise if one or more service requests that have a server identification parameter attached to them were forwarded to the query server during the time the query server became available and the time the text queued service request was forwarded to it.

It is a characteristic of the business intelligence application to which the current embodiment is applied that there are frequently groups of related service requests which are more efficiently executed by a single server. For example, the results of a query request are usually presented in pages, typically, of say 10 rows of data per page, with an individual service request being required to return each of these query pages. A refinement of the basic invention allows service requests which are related to a previous service request, in this respect, (e.g. all requests for pages with the exception of the very first page) to be queued directly to the queue of the query server that processed the initial request.

In the queuing model and method of operation thereof of the present invention the selection of a query server to which a request is forwarded is made by the dispatcher 206. The dispatcher 206 considers a number of factors when making this decision. These parameters will now be discussed. The dispatcher 206 considers the overhead associated with establishing and disconnecting from query sessions. All requests handled by the application servers must have an associated user for authentication purposes. For every user handled by a specific query server, a user session is created, that is, a user session defines the relationship between a particular identified user and a specific query server. Each user session has some associated overhead such as database handles and computer memory, so the overall capacity of the system is improved if the total number of user sessions can be optimized. The queue selection algorithm employed by the dispatcher 206 will not in fact be a strictly first in first out scheme. Rather a history of query server service request interactions for previous user-based requests is maintained. Further numerous parameters and the values they identify are used to refine the behavior of the queuing mechanism associated with the queue 210 of the dispatcher 206.

Max Server Session is a parameter that specifies the number of servers upon which each user can be active. If a request for a server arrives for a user, and no available server is active for that user, then an idle server will be assigned as long as the current number of servers associated with that user is less than this value.

Setting this value to 1 has the effect of locking user sessions to a single server. Setting it to the number of servers (or higher) allows a user session to go to any inactive server, though precedence will still be given to servers where an associated user session is already active.

Request Limit is a parameter that defines the total number of requests that can be waiting for service at any one time. If a request arrives when the number of requests in query server queues is equal to Request Limit the new request will be turned away. A message that indicates "Servers all busy" will be returned to the client.

Because servers often will have a request running, but may quickly finish them and become available, a Minimum Idle Wait interval can ensure that new user sessions are not created arbitrarily. If a Minimum Idle Wait interval is established and a request is received for a user which has not reached the Max Server Session limit, then the dispatcher 206 will wait at least this long before assigning a new query server for a request if none is currently available.

It is more costly to switch a user to a new server if the user already has its quotas of session servers active. This is because the cost incurred is not only the cost of initiating a new session but also of closing one of the existing sessions in order to keep the overall session count within that defined by Max Server Session. Consequently, a separate metric called Minimum Switch Wait is provided to define the time to wait before a user which already has Max Server Session servers assigned will be switched to a new server and have a preexisting session closed. This will typically be several times the value for Minimum Idle Wait. If it is set to "unlimited" users will not be switched to idle servers once they reach Max Server Session. Instead they will remain in the main queue until a server where they are already resident becomes available.

The current embodiment of the invention has been presented with a particular number of dispatchers, server managers and query servers. It will be apparent to one skilled in the art that the numbers of specific elements of the arrangement of servers suitably used by an embodiment of the invention is for exemplary purposes only. The specific number of these components may vary and still lie within the scope of the invention.

An embodiment of the invention that contains a server manager located between the dispatcher 206 and query servers has been presented. Server managers are implemented when the number of sockets being maintained in an "open" state is of importance. In an alternative embodiment of the invention there are no server managers located between the query servers and the dispatcher 206. Such an embodiment is straightforward to derive within the scope of the invention. In this embodiment, each query server communicates its status (ready or busy) directly back to the dispatcher 206 rather than communicating to the server manager which batches up and relays this information to the dispatcher 206. This embodiment is simpler and so may be more efficient in situations with a smaller number of servers. The disadvantage of not using a server manager is that there will be more communication paths to the dispatcher 206. This could lead to a resource issue on the computer system on which the dispatcher 206 resides if there are a large number of individual query servers.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A two tier information retrieval system for distributing one or more service requests to one or more query servers, the service request being from a client, the system comprising:
   a web server in the first tier, the web server invoking a gateway upon receiving the service request;
   one or more query servers suitable for fulfilling the service request,
   the gateway determining a presence of a server identification parameter in the service request, the server identification parameter identifying a query server among the one or more query servers, the query server having handled a previous service request from the client;
   the gateway distributing the service request directly to the query server identified by the server identification parameter;
   a dispatcher in communication with the web server the dispatcher and the one or more query servers forming a second tier for receiving information related to a second service request without the server identification parameter from the gateway, for receiving status information from the one or more query servers, and for forwarding the second service request to an available query server of the one or more query servers; the dispatcher including a queue for the second service request; and
   a server manager monitoring and collecting information related to the operation of the one or more query servers, the server manager communicating the collected information to the dispatcher.

2. The system according to claim 1, wherein the server manager initiates and terminates a configured number of processes on the one or more query servers.

3. The system according to claim 2, wherein the information received by the dispatcher is the second service request.

4. A two tier information retrieval system for providing a response to a client originating a service request, the system comprising:
   a web server in the first tier, the web server invoking a gateway upon receiving the service request;
   one or more query servers, the one or more query servers receiving service request from the gateway for fulfilling the service request;
   the gateway determining a presence of a server identification parameter, the server identification parameter identifying a query server from the one or more query servers, the query server, having handled a previous service request from the client;
   the gateway distributing the service request directly to the query server identified by the server identification parameter; and
   a dispatcher in communication with the web server, the dispatcher and the one or more query servers forming a second tier for receiving information related to a second service request without the server identification parameter from the gateway, for receiving status information from the one or more query servers, and for forwarding the second service request to an available query server of the one or more query servers; and the dispatcher including a queue for the second service request receiving information related to the one or more query servers, the dispatcher communicating with the gateway and directing the gateway for distributing of service requests with no server identification parameter.

5. The system according to claim 4 wherein the information received by the dispatcher is the second service request.

6. The system according to claim 4, wherein the one or more query servers comprise a queue maintaining the service request.

7. The system according to claim 4, further comprising:
    a server manager, the server manager collecting information related to the operation of the one or more query servers and providing the information to the dispatcher.

8. The system according to claim 7, wherein the dispatcher comprises a queue for maintaining the service request.

* * * * *